(12) United States Patent
Ono et al.

(10) Patent No.: US 11,539,381 B2
(45) Date of Patent: Dec. 27, 2022

(54) RADIO FREQUENCY CIRCUIT, ANTENNA MODULE, AND COMMUNICATION DEVICE

(71) Applicant: Murata Manufacturing Co., Ltd., Kyoto (JP)

(72) Inventors: Atsushi Ono, Nagaokakyo (JP); Hirotsugu Mori, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 17/215,615

(22) Filed: Mar. 29, 2021

(65) Prior Publication Data

US 2021/0306013 A1 Sep. 30, 2021

(30) Foreign Application Priority Data

Mar. 30, 2020 (JP) .............................. JP2020-060558

(51) Int. Cl.
*H04B 1/00* (2006.01)
*H04B 1/04* (2006.01)
*H04B 1/74* (2006.01)

(52) U.S. Cl.
CPC ........... *H04B 1/0078* (2013.01); *H04B 1/006* (2013.01); *H04B 1/04* (2013.01); *H04B 1/745* (2013.01); *H04B 2001/0408* (2013.01)

(58) Field of Classification Search
CPC ........ H04B 1/0078; H04B 1/006; H04B 1/04; H04B 1/745; H04B 2001/0408
See application file for complete search history.

(56) References Cited

U.S. PATENT DOCUMENTS

| 5,796,772 A * | 8/1998 | Smith .................... | H04B 1/406 375/259 |
| 5,881,369 A * | 3/1999 | Dean .................... | H04B 1/0082 455/86 |
| 6,130,897 A * | 10/2000 | Ishida .................... | H04B 1/406 370/280 |
| 8,638,819 B2 * | 1/2014 | Chen .................... | H04B 1/0057 370/280 |

(Continued)

FOREIGN PATENT DOCUMENTS

JP     H10-84299 A     3/1998
JP     2006-128881 A   5/2006

(Continued)

*Primary Examiner* — Jaison Joseph
(74) *Attorney, Agent, or Firm* — Pearne & Gordon LLP

(57) ABSTRACT

A radio frequency circuit includes: a first filter having a first passband that corresponds to a portion of a frequency range of a first communication band allocated as a communication band for TDD; a second filter having a second passband that corresponds to a portion of the frequency range of the first communication band, the second passband being different from the first passband; a power amplifier that amplifies a transmission signal in the first communication band; a low-noise amplifier that amplifies a reception signal in the first communication band; and a switch that switches between connecting the first filter and the power amplifier and connecting the first filter and the low-noise amplifier, and switches between connecting the second filter and the power amplifier and connecting the second filter and the low-noise amplifier.

18 Claims, 11 Drawing Sheets

(56) References Cited

U.S. PATENT DOCUMENTS

| | | | | |
|---|---|---|---|---|
| 9,319,214 B2* | 4/2016 | Khlat | ......................... | H04L 5/18 |
| 2005/0009484 A1* | 1/2005 | Imai | ......................... | H03F 3/602 |
| | | | | 455/144 |
| 2016/0134414 A1* | 5/2016 | Pehlke | .................. | H04B 1/0057 |
| | | | | 370/280 |
| 2017/0163229 A1* | 6/2017 | Oyama | ................... | H03F 3/213 |
| 2019/0273314 A1* | 9/2019 | Wloczysiak | ......... | H04B 1/0057 |
| 2020/0136726 A1* | 4/2020 | Tam | ........................ | H04B 10/90 |
| 2020/0366272 A1 | 11/2020 | Nosaka | | |
| 2020/0366273 A1 | 11/2020 | Nosaka | | |
| 2021/0013846 A1 | 1/2021 | Ono | | |
| 2021/0111742 A1* | 4/2021 | Hitomi | ................. | H04B 1/0064 |
| 2021/0194452 A1* | 6/2021 | Tsukamoto | ............... | H03F 3/72 |
| 2021/0250054 A1* | 8/2021 | Tanaka | ....................... | H03F 3/72 |
| 2021/0258094 A1* | 8/2021 | Obiya | .................. | H04B 1/0057 |
| 2021/0351903 A1* | 11/2021 | Mori | ......................... | H04L 5/26 |
| 2022/0069847 A1* | 3/2022 | Ono | ..................... | H04B 1/0067 |

FOREIGN PATENT DOCUMENTS

| | | |
|---|---|---|
| JP | 2008-160629 A | 7/2008 |
| WO | 2019/150688 A1 | 8/2019 |
| WO | 2019/150689 A1 | 8/2019 |
| WO | 2019/244757 A1 | 12/2019 |

* cited by examiner

For transmission of signal in A1 band

For transmission of signal in A2 band

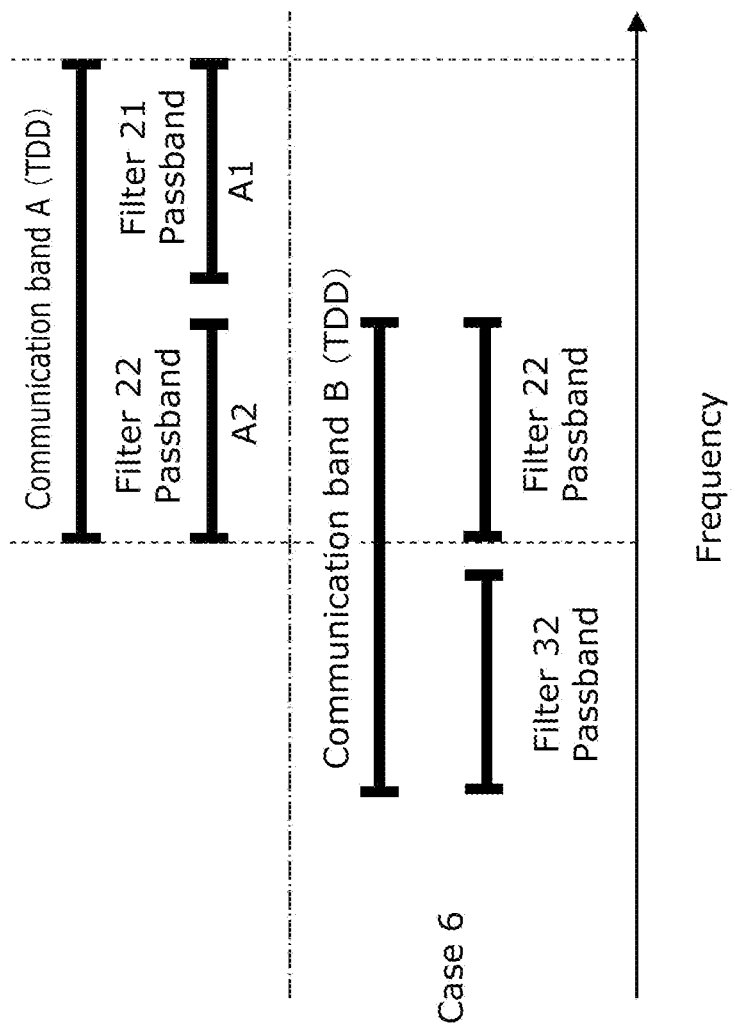

RADIO FREQUENCY CIRCUIT, ANTENNA MODULE, AND COMMUNICATION DEVICE

CROSS REFERENCE TO RELATED APPLICATION

The present application is based on and claims priority to Japanese Patent Application No. 2020-060558 filed on Mar. 30, 2020. The entire disclosure of the above-identified application, including the specification, drawings and claims is incorporated herein by reference in its entirety.

TECHNICAL FIELD

The present disclosure relates to radio frequency circuits, antenna modules, and communication devices.

BACKGROUND

To enable faster and higher-capacity communications, recent communications services have been working towards broadening communication bandwidth and making a simultaneous use of communication bands.

Japanese Unexamined Patent Application Publication No. 2006-128881 discloses a multiplexer capable of duplexing and multiplexing radio frequency signals in two different communication bands. The multiplexer disclosed in Japanese Unexamined Patent Application Publication No. 2006-128881 includes an LC filter having an inductor and a capacitor. Such multiplexer is capable of duplexing and multiplexing radio frequency signals in broad communication bands.

BRIEF SUMMARY

The Third Generation Partnership Project (3GPP) has been working to utilize a broad communication band allocated for Time Division Duplex (TDD) as a communication band for the Fifth Generation-New Radio (5G-NR). However, the use of a single LC filter to support such a broad communication band is not enough to satisfy the specifications for unwanted radiation in the vicinity of the passband. Also, the use of a single acoustic wave filter is not enough to cover a broad passband that incorporates the frequency range of the broad communication band.

The present disclosure has been conceived to solve such problems and its aim is to provide radio frequency circuits, antenna modules, and communication devices capable of transferring radio frequency signals in a broad communication band allocated for TDD without signal degradation.

To achieve the above object, the radio frequency circuit according to an aspect of the present disclosure includes: a first filter having a first passband that corresponds to a portion of a frequency range of a first communication band allocated as a communication band for time division duplex; a second filter having a second passband that corresponds to a portion of the frequency range of the first communication band, the second passband being different from the first passband; a power amplifier that amplifies a transmission signal in the first communication band; a low-noise amplifier that amplifies a reception signal in the first communication band; and a first switch that switches between connecting the first filter to the power amplifier and connecting the first filter to the low-noise amplifier, and switches between connecting the second filter to the power amplifier and connecting the second filter to the low-noise amplifier.

The present disclosure is capable of providing a radio frequency circuit, an antenna module, and a communication device that enable the transfer of radio frequency signals in a broad communication band allocated for TDD without signal degradation.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 is a diagram showing a second frequency relationship between the TDD communication band used by the radio frequency circuit according to Embodiment 2 and filter passbands.

DETAILED DESCRIPTION OF EMBODIMENTS

Figure 1:
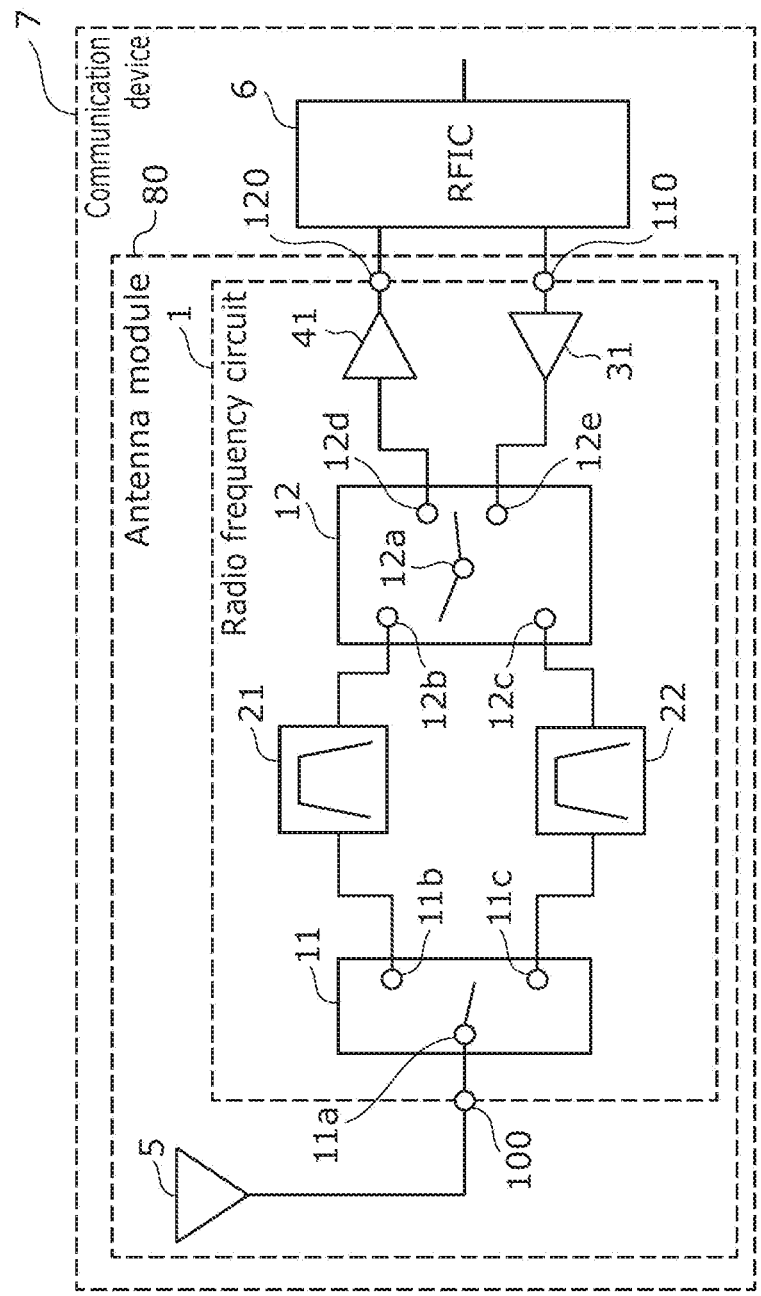
FIG. 1 is a diagram showing the circuit configurations of a radio frequency circuit, an antenna module, and a communication device according to Embodiment 1.

The following describes in detail the embodiments according to the present disclosure with reference to the drawings. Note that the following embodiments show a comprehensive or specific example of the present disclosure. The numerical values, shapes, materials, structural elements, the arrangement and connection of the structural elements, etc. shown in the following embodiments are mere examples, and thus are not intended to limit the present disclosure. Of the structural elements described in the following embodiments, structural elements not recited in any one of the independent claims are described as optional structural elements. Also, the size of the structural elements and the size ratio thereof shown in the drawings are not necessarily exact.

In the following description, "path" means a transmission line that includes wiring through which a radio frequency signal propagates, an electrode directly connected to the wiring, a terminal directly connected to the wiring or the electrode, and so forth.

Embodiment 1

1.1 Circuit Configurations of Radio Frequency Circuit 1 and Communication Device 7

FIG. 1 is a diagram showing the circuit configurations of radio frequency circuit 1, antenna module 80, and communication device 7 according to Embodiment 1. As shown in the drawing, communication device 7 includes radio frequency circuit 1, antenna 5, and radio frequency (RF) signal processing circuit (RFIC) 6. Antenna module 80 includes radio frequency circuit 1 and antenna 5.

RFIC 6 is an RF signal processing circuit that processes a radio frequency signal that is to be transmitted or has been received by antenna 5. More specifically, RFIC 6 performs signal processing, such as down-conversion, on a reception signal input via a reception path of radio frequency circuit 1, and outputs the resulting reception signal to a base band signal processing circuit (BBIC: not illustrated). Also, RFIC 6 outputs, to a transmission path of radio frequency circuit 1, a transmission signal that has been processed from a signal input from the BBIC.

RFIC 6 also serves as a controller that controls the connections of switches 11 and 12 included in radio frequency circuit 1, based on a communication band and a frequency range to be used. More specifically, RFIC 6 operates switches 11 and 12 included in radio frequency circuit 1 by a control signal (not illustrated). Note that the controller may be provided outside of RFIC 6, and thus may be provided, for example, in radio frequency circuit 1.

Antenna 5 is connected to antenna connection terminal 100 of radio frequency circuit 1. Antenna 5 radiates a radio frequency signal output from radio frequency circuit 1. Antenna 5 also receives a radio frequency signal from outside, and outputs the received radio frequency signal to radio frequency circuit 1.

Note that antenna 5 is not an essential structural element of communication device 7 according to the present embodiment.

The following describes a detailed configuration of radio frequency circuit 1.

Radio frequency circuit 1 includes antenna connection terminal 100, transmission input terminal 110, reception output terminal 120, filters 21 and 22, switches 11 and 12, power amplifier 31, and low-noise amplifier 41. Radio frequency circuit 1 transfers radio frequency signals in communication band A (first communication band).

Communication band A in the present embodiment is, for example, n44 (703-803 MHz) of 5G-NR. n44 of 5G-NR is allocated as a 5G communication band for TDD. Other examples of communication band A include: n257 (26.5-29.5 GHz) of 5G-NR. Alternatively, communication band A may be, for example, B44 (703-803 MHz) of Fourth Generation (4G)-Long Term Evolution (LTE). B44 of 4G-LTE is allocated as a 4G communication band for TDD.

Examples of communication band A also include the following 5G-NR communication bands: n77 (3.3-4.2 GHz); n78 (3.3-3.8 GHz); n79 (4.4-5.0 GHz); n46 (5.15-5.925 GHz); n96 (5.925-7.125 GHz); and n50 (1.432-1.517 GHz).

Antenna connection terminal 100 is connected to antenna 5.

Filter 22, which is an example of the first filter, has a first passband (A2 band). Filter 22 is connected to switches 11 and 12. Filter 21, which is an example of the second filter, has a second passband (A1 band) that is different from the first passband (A2 band). Filter 21 is connected to switches 11 and Power amplifier 31, which is connected to transmission input terminal 110 and switch 12, amplifies a transmission signal in communication band A. Low-noise amplifier 41, which is connected to reception output terminal 120 and switch 12, amplifies a reception signal in communication band A.

Switch 11, which is an exemplary second switch, includes common terminal 11a, and selection terminals 11b and 11c. Common terminal 11a is connected to antenna connection terminal 100, selection terminal 11b to filter 21, and selection terminal 11c to filter 22. Having such connection structure, switch 11 switches between connecting antenna connection terminal 100 to filter 21, and connecting antenna connection terminal 100 to filter 22. Switch 11 is implemented, for example, as a single pole double throw (SPDT) switch circuit.

Switch 12, which is an example of the first switch, includes common terminal 12a, and selection terminals 12b (second selection terminal), 12c (first selection terminal), 12d (fourth selection terminal), and 12e (third selection terminal). Selection terminal 12b is connected to filter 21, selection terminal 12c to filter 22, selection terminal 12d to the input terminal of low-noise amplifier 41, and selection terminal 12e to the output terminal of power amplifier 31. Switch 12 switches between connecting common terminal 12a to selection terminal 12b and connecting common terminal 12a to selection terminal 12c, and switches between connecting common terminal 12a to selection terminal 12d and connecting common terminal 12a to selection terminal 12e. Having such connection structure, switch 12 switches between connecting filter 22 to power amplifier 31 and connecting filter 22 to low-noise amplifier 41, and switches between connecting filter 21 to power amplifier 31 and connecting filter 21 low-noise amplifier 41. Switch 12 is, for example, a switch circuit that includes an SPDT sub-switch having common terminal 12a, and selection terminals 12b and 12c, and an SPDT sub-switch having common terminal 12a, and selection terminals 12d and 12e, where common terminals 12a of these two sub-switches are connected.

1.2 Frequency Relationships Between Communication Band and Filter Passbands

The following describes the relationships between the frequency ranges of radio frequency signals transferred by radio frequency circuit 1 according to the present embodiment and the passbands of filters 21 and 22.

Figure 2:
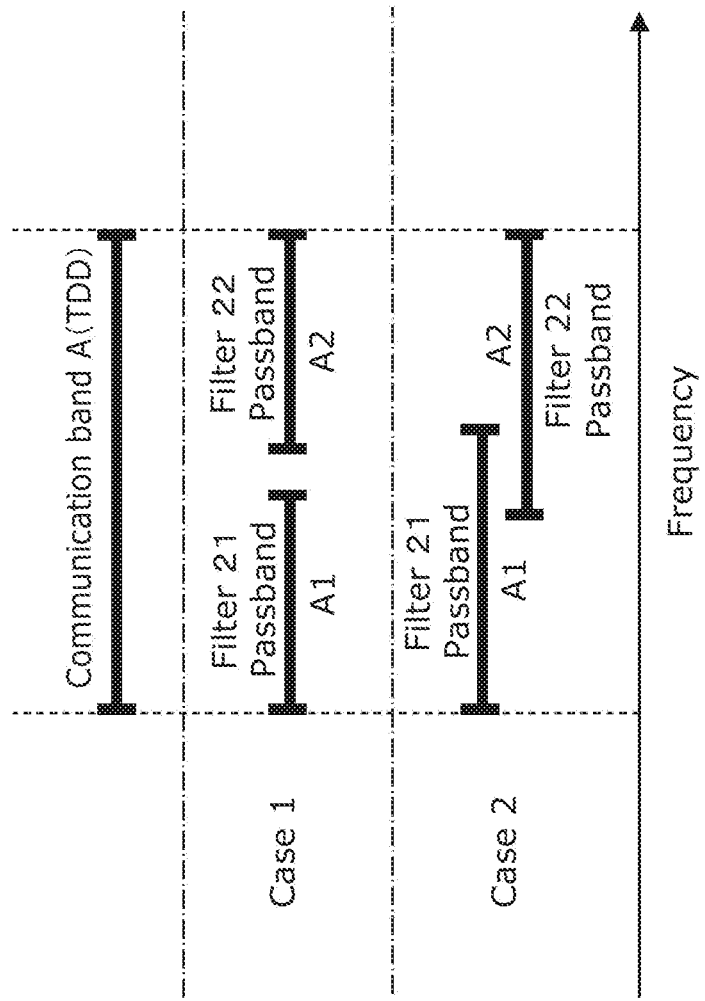
FIG. 2 is a diagram showing a frequency relationship between a TDD communication band used by the radio frequency circuit according to Embodiment 1 and filter passbands.

FIG. 2 is a diagram showing a frequency relationship between communication band A (TDD) used by radio frequency circuit 1 according to Embodiment 1 and the passbands of filters 21 and 22. As shown in the drawing, the passband of filter 22 (A2 band) corresponds to a portion of the frequency range of communication band A. Also, the passband of filter 21 (A1 band) corresponds to a portion of the frequency range of communication band A. The frequency ranges of the passband of filter 21 (A1 band) and the passband of filter 22 (A2 band) are different. Note that the A1 band and the A2 band may not overlap as shown as "Case 1" in FIG. 2.

In Japan, a plurality of mobile network operators (MNOs) are allocated to n77 for 5G-NR. For example, a first MNO is allocated to 3600-3700 MHz, a second MNO to 3700-3800 MHz, a third MNO to 3800-3900 MHz, a fourth MNO to 3900-4000 MHz, and the second MNO again to 4000-4100 MHz. In this case, for example, the passband of filter 21 may correspond to the frequency range allocated to the first MNO, and the passband of filter 22 may correspond to the frequency range allocated to the second MNO.

Alternatively, the A1 band and the A2 band may partially overlap as shown as "Case 2" in FIG. 2.

1.3 Relationships Between TDD Transfer Mode and Switch Connections

The following describes the relationships between the TDD transfer mode and connection statuses of switches 11 and 12 in radio frequency circuit 1 according to the present embodiment.

Figure 3A:
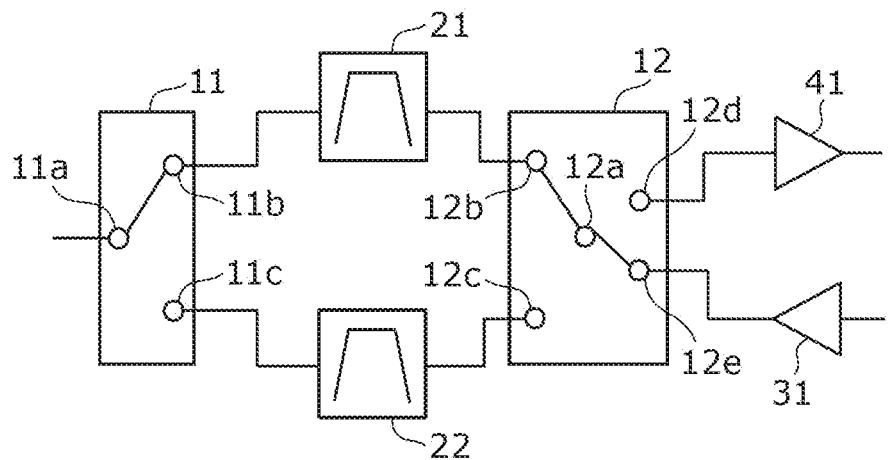
FIG. 3A is a diagram showing a circuit connection for transmitting a signal in an A1 band in the radio frequency circuit according to Embodiment 1.

FIG. 3A is a diagram showing a circuit connection for transferring a transmission signal in the A1 band in radio frequency circuit 1 according to Embodiment 1. The A1 band is the passband of filter 21 and corresponds to a portion of the frequency range of communication band A. When radio frequency circuit 1 transfers a transmission signal in the A1 band, common terminal 11a and selection terminal 11b of switch 11 are connected, selection terminal 12b (second selection terminal) and common terminal 12a of switch 12 are connected, and common terminal 12a and selection terminal 12e (third selection terminal) of switch 12 are connected. These connections allow the transmission signal in the A1 band to flow through transmission input terminal 110, power amplifier 31, switch 12, filter 21, switch 11, and antenna connection terminal 100 in stated order to be outputted from antenna 5.

Figure 3B:
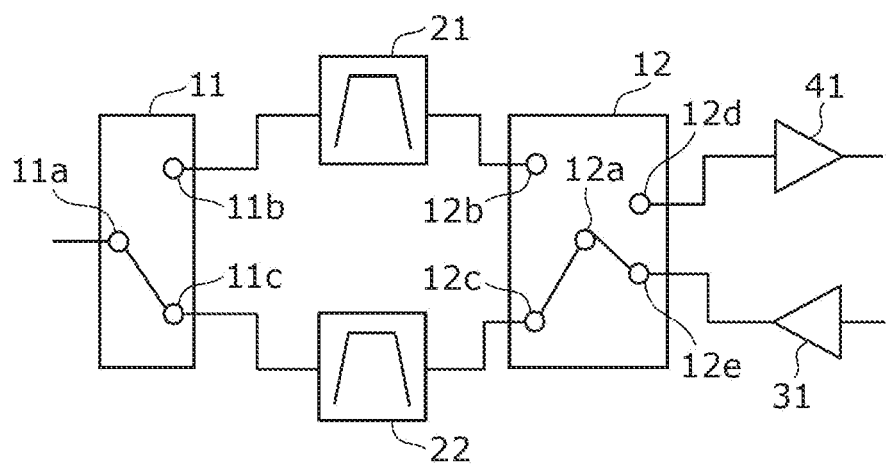
FIG. 3B is a diagram showing a circuit connection for transmitting a signal in an A2 band in the radio frequency circuit according to Embodiment 1.

FIG. 3B is a diagram showing a circuit connection for transferring a transmission signal in the A2 band in radio frequency circuit 1 according to Embodiment 1. The A2 band is the passband of filter 22 and corresponds to a portion of the frequency range of communication band A. When radio frequency circuit 1 transfers a transmission signal in the A2 band, common terminal 11a and selection terminal 11c of switch 11 are connected, selection terminal 12c (first selection terminal) and common terminal 12a of switch 12 are connected, and common terminal 12a and selection terminal 12e (third selection terminal) of switch 12 are connected. These connections allow the transmission signal in the A2 band to flow through transmission input terminal 110, power amplifier 31, switch 12, filter 22, switch 11, and antenna connection terminal 100 in stated order to be outputted from antenna 5.

Figure 3C:
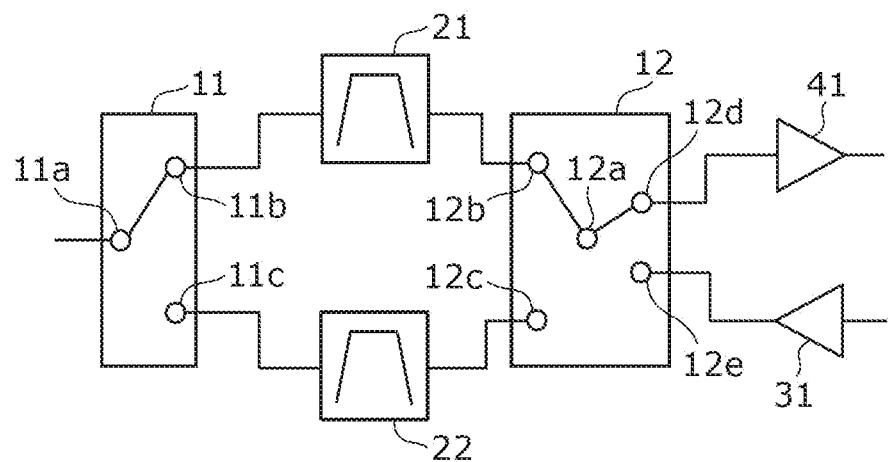
FIG. 3C is a diagram showing a circuit connection for receiving a signal in the A1 band in the radio frequency circuit according to Embodiment 1.

FIG. 3C is a diagram showing a circuit connection for transferring a reception signal in the A1 band in radio frequency circuit 1 according to Embodiment 1. When radio frequency circuit 1 transfers a reception signal in the A1 band, common terminal 11a and selection terminal 11b of switch 11 are connected, selection terminal 12b (second selection terminal) and common terminal 12a of switch 12 are connected, and common terminal 12a and selection terminal 12d (fourth selection terminal) of switch 12 are connected. These connections allow the reception signal in the A1 band to flow through antenna connection terminal 100, switch 11, filter 21, switch 12, and low-noise amplifier 41 in stated order to be output from reception output terminal 120.

Figure 3D:
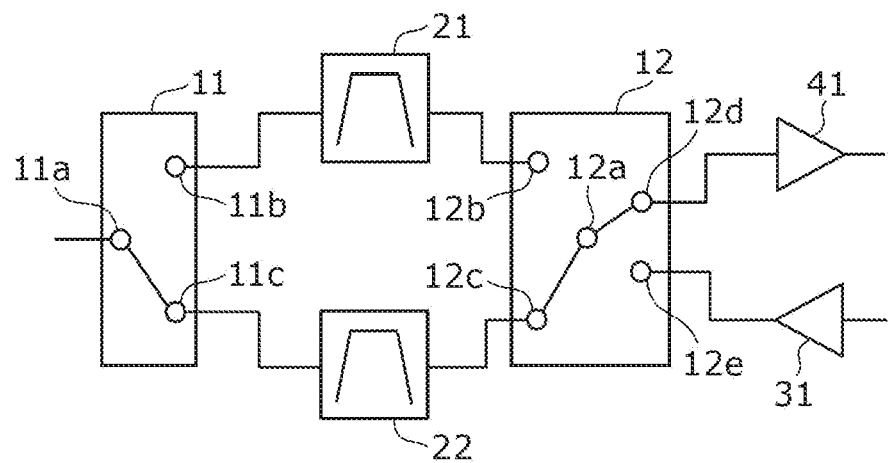
FIG. 3D is a diagram showing a circuit connection for receiving a signal in the A2 band in the radio frequency circuit according to Embodiment 1.

FIG. 3D is a diagram showing a circuit connection for transferring a reception signal in the A2 band in radio frequency circuit 1 according to Embodiment 1. When radio frequency circuit 1 transfers a reception signal in the A2 band, common terminal 11a and selection terminal 11c of switch 11 are connected, selection terminal 12c (first selection terminal) and common terminal 12a of switch 12 are connected, and common terminal 12a and selection terminal 12d (fourth selection terminal) of switch 12 are connected. These connections allow the reception signal in the A2 band to flow through antenna connection terminal 100, switch 11, filter 22, switch 12, and low-noise amplifier 41 in stated order to be outputted from reception output terminal 120.

As described above, radio frequency circuit 1 switches between two filters 21 and 22 to transfer a transmission signal and a reception signal in a broad communication band A, using TDD.

In the future, B44 of 4G-LTE specified by 3GPP can be used as n44 of 5G-NR. However, n44 is a broad frequency band having a fractional bandwidth of some 14% (a bandwidth of 100 MHz). It is thus difficult for a single acoustic wave filter having a narrow passband to support n44. Meanwhile, a single LC filter having a broad passband is not enough to support n44 because of an insufficient attenuation in the vicinity of the passband and the resulting failure to satisfy specifications for unwanted radiation in the vicinity of the passband.

In radio frequency circuit 1 according to the present embodiment, two filters 21 and 22 having different passbands enable the signal transfer in communication band A allocated for TDD (e.g., n44) in which a transmission signal and a reception signal are transferred in different time slots. Stated differently, radio frequency circuit 1 according to the present embodiment covers a broad communication band A by combining the passbands of two filters 21 and 22, thus achieving a signal transfer with a low loss. Also, two filters 21 and 22 having relatively narrow passbands cover communication band A, thereby ensuring a sufficient attenuation in the vicinity of the passband and satisfying specifications for unwanted radiation in the vicinity of the passband. Radio frequency circuit 1 according to the present embodiment is thus capable of transferring radio frequency signals in a broad communication band A allocated for TDD without signal degradation.

Note that filters 21 and 22 may be, for example, acoustic wave filters. Acoustic wave resonators included in the acoustic wave filters may each be a surface acoustic wave (SAW) resonator or may be a bulk acoustic wave (BAW) resonator. Note that SAW includes not only surface wave but also boundary wave. In the case where a transmission signal and a reception signal transferred by radio frequency circuit 1 are millimeter-wave signals, filters 21 and 22 may be distributed-constant filters. Also, filters 21 and 22 may each be a filter with a stub.

In this configuration, a plurality of narrow-band acoustic wave filters having steep attenuation characteristics and capable of the low-loss signal transfer are disposed in parallel. This configuration thus achieves the bandpass characteristics of a broad communication band A having steep attenuation characteristics and capable of a low-loss signal transfer.

Although not being an essential structural element of radio frequency circuit 1, switch 11 is capable of improving the isolation between a radio frequency signal that passes through filter 21 and a radio frequency signal that passes through filter 22. Switch 11 is effective particularly for the case where the passband of filter 21 and the passband of filter 22 partially overlap ("Case 2" in FIG. 2).

Embodiment 2

Radio frequency circuit 1 according to Embodiment 1 transfers radio frequency signals in communication band A for TDD. Radio frequency circuit 2 according to Embodiment 2 further transfers radio frequency signals in communication band B for Frequency Division Duplex (FDD) in addition to radio frequency signals in communication band A for TDD.

2.1 Circuit Configurations of Radio Frequency Circuit 2 and Communication Device 8

Figure 4:
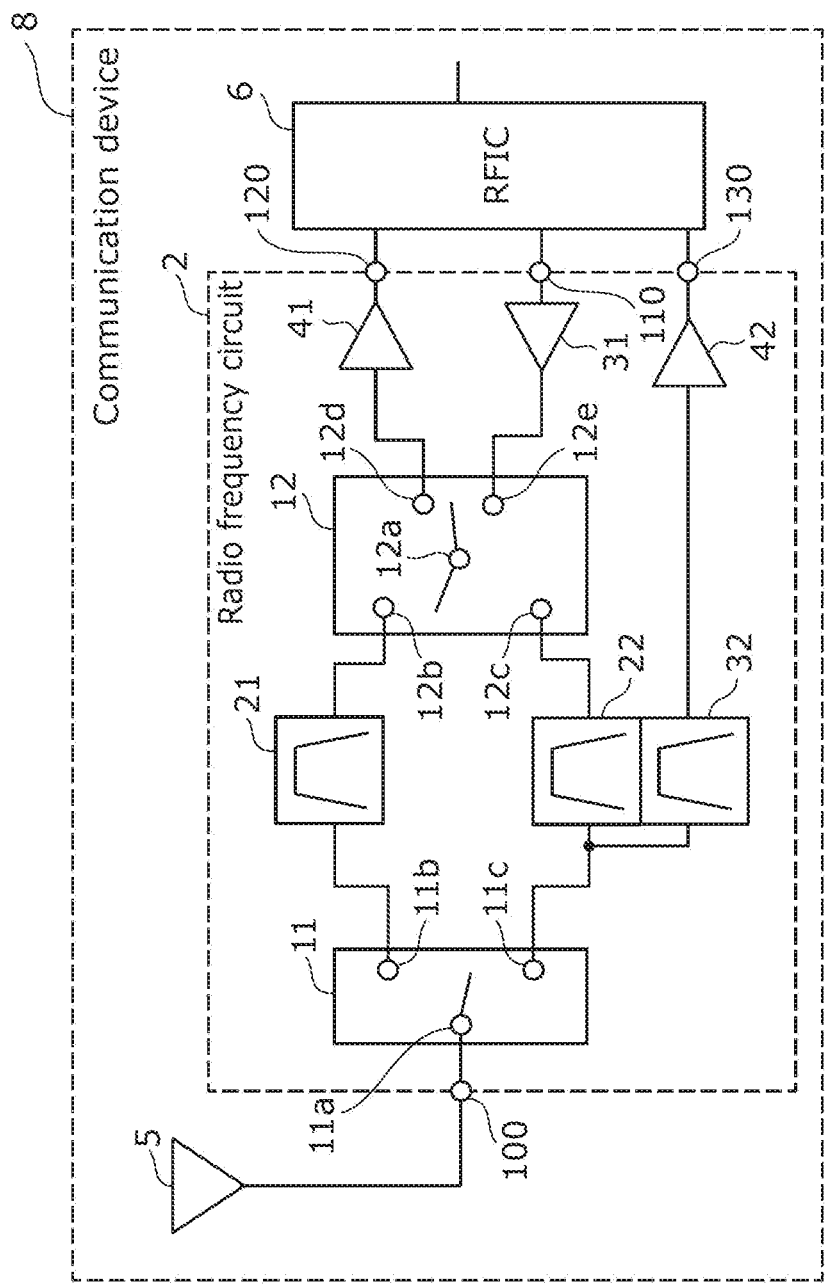
FIG. 4 is a diagram showing the circuit configurations of a radio frequency circuit and a communication device according to Embodiment 2.

FIG. 4 is a diagram showing the circuit configurations of radio frequency circuit 2 and communication device 8 according to Embodiment 2. As shown in the drawing, communication device 8 includes radio frequency circuit 2, antenna 5, and RFIC 6. Communication device 8 according to the present embodiment is different from communication device 7 according to Embodiment 1 only in the configuration of radio frequency circuit 2. As such, the following description focuses on radio frequency circuit 2 to describe communication device 8 according to the present embodiment.

Radio frequency circuit 2 includes antenna connection terminal 100, transmission input terminal 110, reception output terminals 120 and 130, filters 21, 22, and 32, switches 11 and 12, power amplifier 31, and low-noise amplifiers 41 and 42. Radio frequency circuit 2 transfers radio frequency signals in communication band A (first communication band) and radio frequency signals in communication band B (second communication band).

Communication band A in the present embodiment is, for example, n44 (703-803 MHz) of 5G-NR. n44 of 5G-NR is allocated as a 5G communication band for TDD. Other examples of communication band A include B44 (703-803 MHz) of 4G-LTE. B44 of 4G-LTE is allocated as a 4G communication band for TDD.

Communication band B in the present embodiment is, for example, B28 (703-748 MHz as the transmission band and 758-803 MHz as the reception band) of 4G-LTE.

In the present embodiment, for example, communication band A may be n50 of 5G-NR, and communication band B may be any one of: B11 (1427.9-1447.9 MHz as the transmission band and 1475.9-1495.9 MHz as the reception band), B21 (1447.9-1462.9 MHz as the transmission band and 1495.9-1510.9 MHz as the reception band), B32 (1452-1496 MHz) of 4G-LTE, and n74 (1427-1470 MHz as the transmission band and 1475-1518 MHz as the reception band) of 5G-NR.

Filter 22, which is an example of the first filter, has the first passband (A2 band). Filter 22 is connected to switches 11 and 12. Filter 21, which is an example of the second filter, has the second passband (A1 band) that is different from the first passband (A2 band). Filter 21 is connected to switches 11 and 12. The passband of filter 22 includes the transmission band of communication band B that uses FDD. Filter 32, which is an exemplary third filter, has a third passband (B2 band) that includes the reception band of communication band B. Filter 32 is connected to switch 11 and low-noise amplifier 42. Stated differently, filter 22 and filter 32 are included in a duplexer that transfers a transmission signal and a reception signal in communication band B using FDD.

Note that the passband of filter 22 (A2 band) may include the reception band of communication band B, and the passband of filter 32 (B2 band) may include the transmission band of communication band B.

Power amplifier 31, which is connected to transmission input terminal 110 and switch 12, amplifies a transmission signal in communication band A and a transmission signal in communication band B. Low-noise amplifier 41, which is connected to reception output terminal 120 and switch 12, amplifies a reception signal in communication band A. Low-noise amplifier 42, which is connected to reception output terminal 130 and filter 32, amplifies a reception signal in communication band B.

Switch 11, which is an example of the second switch, includes common terminal 11a, and selection terminals 11b and 11c. Common terminal 11a is connected to antenna connection terminal 100, selection terminal 11b to filter 21, and selection terminal 11c to filters 22 and 32. Having such connection structure, switch 11 switches between connecting antenna connection terminal 100 to filter 21, and connecting antenna connection terminal 100 to filters 22 and 32.

2.2 Frequency Relationships Between Communication Bands and Filter Passbands

The following describes the relationships between the frequency ranges of radio frequency signals transferred by radio frequency circuit 2 according to the present embodiment and the passbands of filters 21, 22 and 32.

Figure 5:
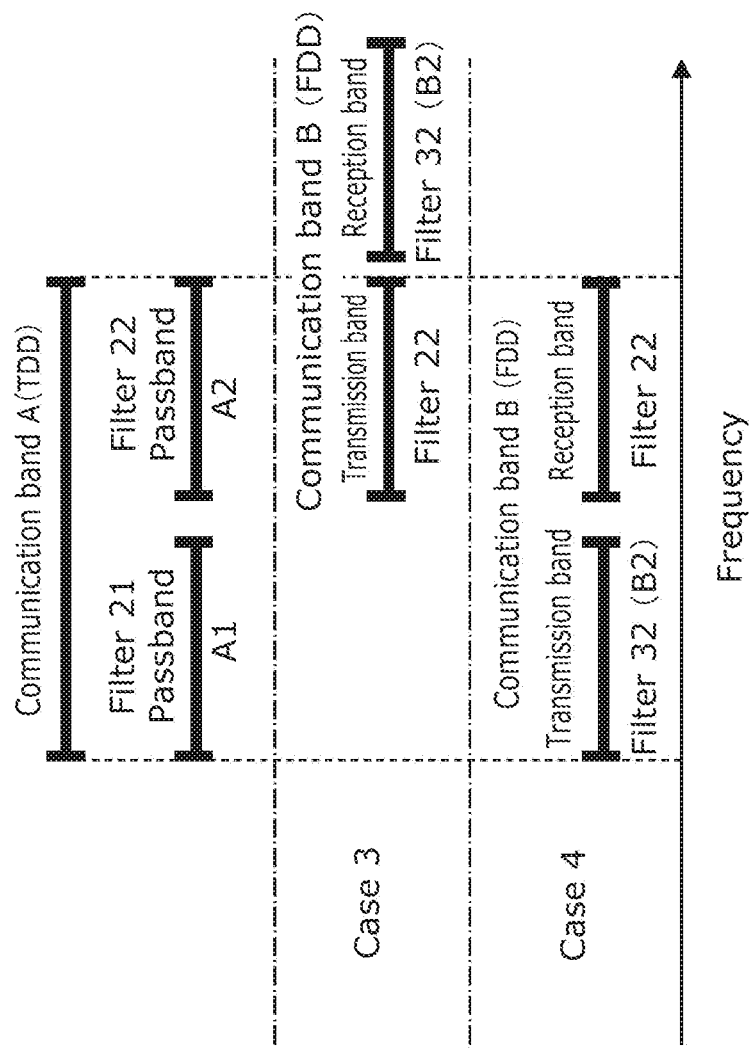
FIG. 5 is a diagram showing a first frequency relationship between the TDD/FDD communication bands used by the radio frequency circuit according to Embodiment 2 and filter passbands.

FIG. 5 is a diagram showing a first frequency relationship between communication band A (TDD)/communication band B (FDD) used by radio frequency circuit 2 according to Embodiment 2 and the passbands of filters 21, 22 and 32.

As shown in the drawing, the passband of filter 22 (A2 band) corresponds to a portion of the frequency range of communication band A, and corresponds to the transmission band of communication band B. Also, the passband of filter 21 (A1 band) corresponds to a portion of the frequency range of communication band A. The frequency ranges of the passband of filter 21 (A1 band) and the passband of filter 22 (A2 band) are different. Also, the passband of filter 32 (B2 band) corresponds to the reception band of communication band B. Note that the A1 band and the A2 band may not overlap or may partially overlap.

Note that as shown as "Case 3" in FIG. 5, the passband of filter 22 (A2 band) included in communication band A may include the transmission band of communication band B. Alternatively, as shown as "Case 4" in FIG. 5, the passband of filter 22 (A2 band) included in communication band A may include the reception band of communication band B.

2.3 Relationships Between TDD/FDD Transfer Modes and Switch Connections

The following describes a relationship between the TDD transfer mode/FDD transfer mode and the connection statuses of switches 11 and 12 in radio frequency circuit 2 according to the present embodiment.

Figure 6A:
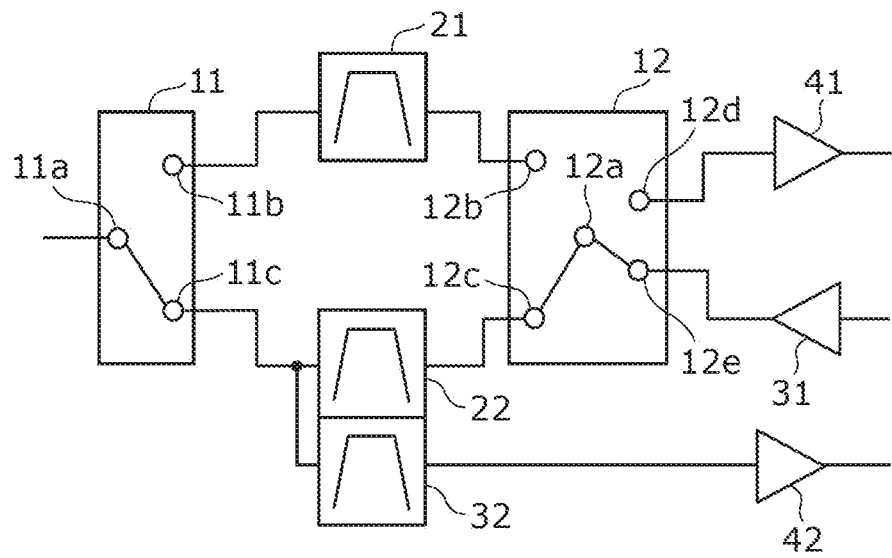
FIG. 6A is a diagram showing a circuit connection for transmitting signals in the A2 band in the radio frequency circuit according to Embodiment 2.

FIG. 6A is a diagram showing a circuit connection for transferring transmission signals in the A2 band in radio frequency circuit 2 according to Embodiment 2. The A2 band is the passband of filter 22. The A2 band corresponds to a portion of the frequency range of communication band A, and corresponds to the transmission band of communication band B. For this reason, the transfer of a transmission signal in the A2 band includes the mode of transferring a transmission signal in communication band A using TDD and the mode of simultaneously transferring a transmission signal and a reception signal in communication band B using FDD. In either of the modes, when radio frequency circuit 2 transfers a transmission signal in the A2 band, common terminal 11a and selection terminal 11c of switch 11 are connected, selection terminal 12c (first selection terminal) and common terminal 12a of switch 12 are connected, and common terminal 12a and selection terminal 12e (third selection terminal) of switch 12 are connected. These connections allow the transmission signal in the A2 band to flow through transmission input terminal 110, power amplifier 31, switch 12, filter 22, switch 11, and antenna connection terminal 100 in stated order to be outputted from antenna 5. Further, in the mode of simultaneously transferring a transmission signal and a reception signal in communication band B using FDD, the reception signal in the B2 band flows through antenna connection terminal 100, switch 11, filter 32, and low-noise amplifier 42 in stated order, simultaneously with the transmission signal in the A2 band, to be outputted from reception outputted terminal 130.

Figure 6B:
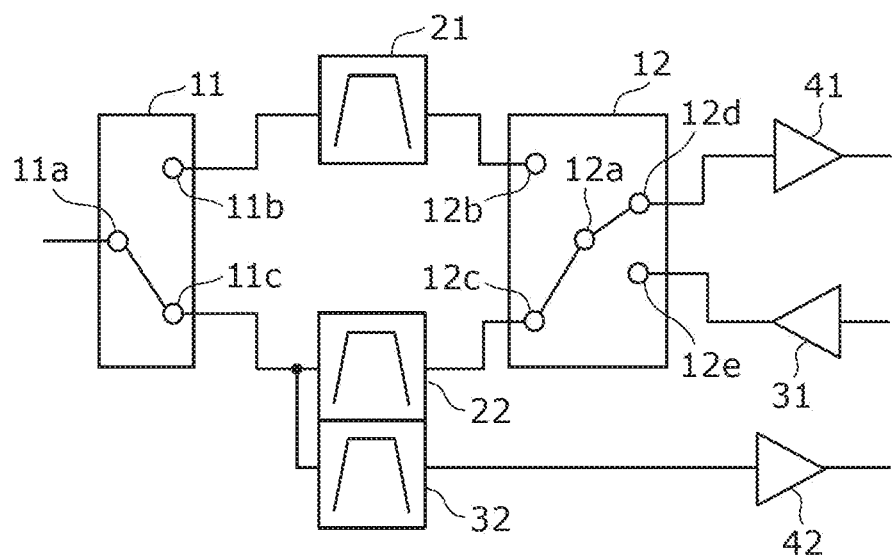
FIG. 6B is a diagram showing a circuit connection for receiving a signal in the A2 band in the radio frequency circuit according to Embodiment 2.

FIG. 6B is a diagram showing a circuit connection for transferring a reception signal in the A2 band in radio frequency circuit 2 according to Embodiment 2. The transfer of a reception signal in the A2 band includes only the mode of transferring a reception signal in communication band A using TDD. In this case, common terminal 11a and selection terminal 11c of switch 11 are connected, selection terminal 12c (first selection terminal) and common terminal 12a of switch 12 are connected, and common terminal 12a and selection terminal 12d (fourth selection terminal) of switch 12 are connected. These connections allow the reception signal in the A2 band to flow through antenna connection terminal 100, switch 11, filter 22, switch 12, and low-noise amplifier 41 in stated order to be outputted from reception output terminal 120.

Note that circuit connections for transferring a transmission signal and a reception signal in the A1 band are the same as those shown in FIG. 3A and FIG. 3C, and thus will not be described here.

As described above, radio frequency circuit 2 switches between two filters 21 and 22 to transfer a transmission signal and a reception signal in a broad communication band A using TDD. Further, radio frequency circuit 2 uses filter 22 to transfer a transmission signal in communication band B using FDD.

Stated differently, in radio frequency circuit 2 according to the present embodiment, a transmission signal and a reception signal of TDD and one of a transmission signal and a reception signal of FDD pass through filter 22. Also, the transmission signal and the reception signal of TDD pass through filter 21 and the transmission signal and the reception signal of FDD do not pass through filter 21. Also, the transmission signal and the reception signal of TDD do not pass through filter 32, and the remaining one of the transmission signal and the reception signal of FDD passes through filter 32.

B44 and n44 are broad bands having a fractional bandwidth of some 14%. It is thus difficult for a single acoustic wave filter to support B44 and n44. Meanwhile, a single LC filter is not enough to support n44 because of an insufficient attenuation in the vicinity of the passband and the resulting failure to satisfy specifications for unwanted radiation in the vicinity of the passband. Also, while being allocated as communication bands for TDD, B44 and n44 overlap the frequency range of B28 for FDD.

In radio frequency circuit 2 according to the present embodiment, two filters 21 and 22 having different passbands enable the signal transfer in communication band A allocated for TDD (e.g., n44) in which a transmission signal and a reception signal are transferred in different time slots. Radio frequency circuit 2 according to the present embodiment is thus capable of transferring radio frequency signals in a broad communication band A allocated for TDD without signal degradation. Further, this configuration uses filter 22 to transfer signals in communication band B allocated for FDD (e.g., B28) in which a transmission signal and a reception signal are transferred in different frequency bands. Stated differently, filter 22 is shared for the signal transfer in communication band A and the signal transfer in communication band B, thereby achieving the downsizing of radio frequency circuit 2 that uses both TDD and FDD.

Note that radio frequency circuit 2 may transfer radio frequency signals in communication band A for TDD and radio frequency signals in communication band B for TDD.

FIG. 7 is a diagram showing a second frequency relationship between communication band A (TDD) and communication band B (TDD) used by radio frequency circuit 2 according to Embodiment 2 and the passbands of filters 21, 22 and 32.

As shown in the drawing, the passband of filter 22 (A2 band) corresponds to a portion of the frequency range of communication band A, and corresponds to a portion of the frequency range of communication band B. Also, the passband of filter 21 (A1 band) corresponds to a portion of the frequency range of communication band A. The frequency ranges of the passband of filter 21 (A1 band) and the passband of filter 22 (A2 band) are different. Also, the passband of filter 32 (B2 band) corresponds to a portion of the frequency range of communication band B. The frequency ranges of the passband of filter 32 (B2 band) and the passband of filter 22 (A2 band) are different. Note that the A1 band and the A2 band may not overlap or may partially overlap.

Note that the passband of filter 32 (B2 band) included in communication band B may be located at a lower frequency side than communication band A as shown as "Case 6" in FIG. 7, or may be located at a higher frequency side than communication band A.

In the case of the second frequency relationship shown in FIG. 7, communication band A may be, for example, n257 (26.5-29.5 GHz) of 5G-NR, and communication band B may be, for example, n258 (24.25-27.5 GHz) of 5G-NR. In this case, n261 (27.5-28.35 GHz) of 5G-NR, for example, may be included as the passband of filter 21 (A1 band).

Also, in the case of the second frequency relationship, communication band A may be, for example, n77 of 5G-NR, and communication band B may be, for example, any one of n42 (3.4-3.6 GHz), n43 (3.6-3.8 GHz), n48 (3.55-3.7 GHz), n49 (3.55-3.7 GHz), n52 (3.3-3.4 GHz), and n78 of 5G-NR.

Also in the case of the second frequency relationship, communication band A may be, for example, n78 of 5G-NR, and communication band B may be, for example, any one of n42, n43, n48, n49, and n52 of 5G-NR.

Also in the case of the second frequency relationship, communication band A may be, for example, n46 of 5G-NR, and communication band B may be, for example, n47 (5.855-5.925 GHz) of 5G-NR.

Also in the case of the second frequency relationship, communication band A may be, for example, n96 of 5G-NR, and communication band B may be, for example, a band in a range between 6.425 GHz and 7.125 GHz specified by 5G-NR.

Embodiment 3

Radio frequency circuit 1 according to Embodiment 1 and radio frequency circuit 2 according to Embodiment 2 cover the frequency range of communication band A for TDD by combining the passbands of two filters. Radio frequency circuit 3 according to Embodiment 3 covers the frequency range of communication band A for TDD by combining the passbands of three filters.

3.1 Circuit Configurations of Radio Frequency Circuit 3 and Communication Device 9

Figure 8:
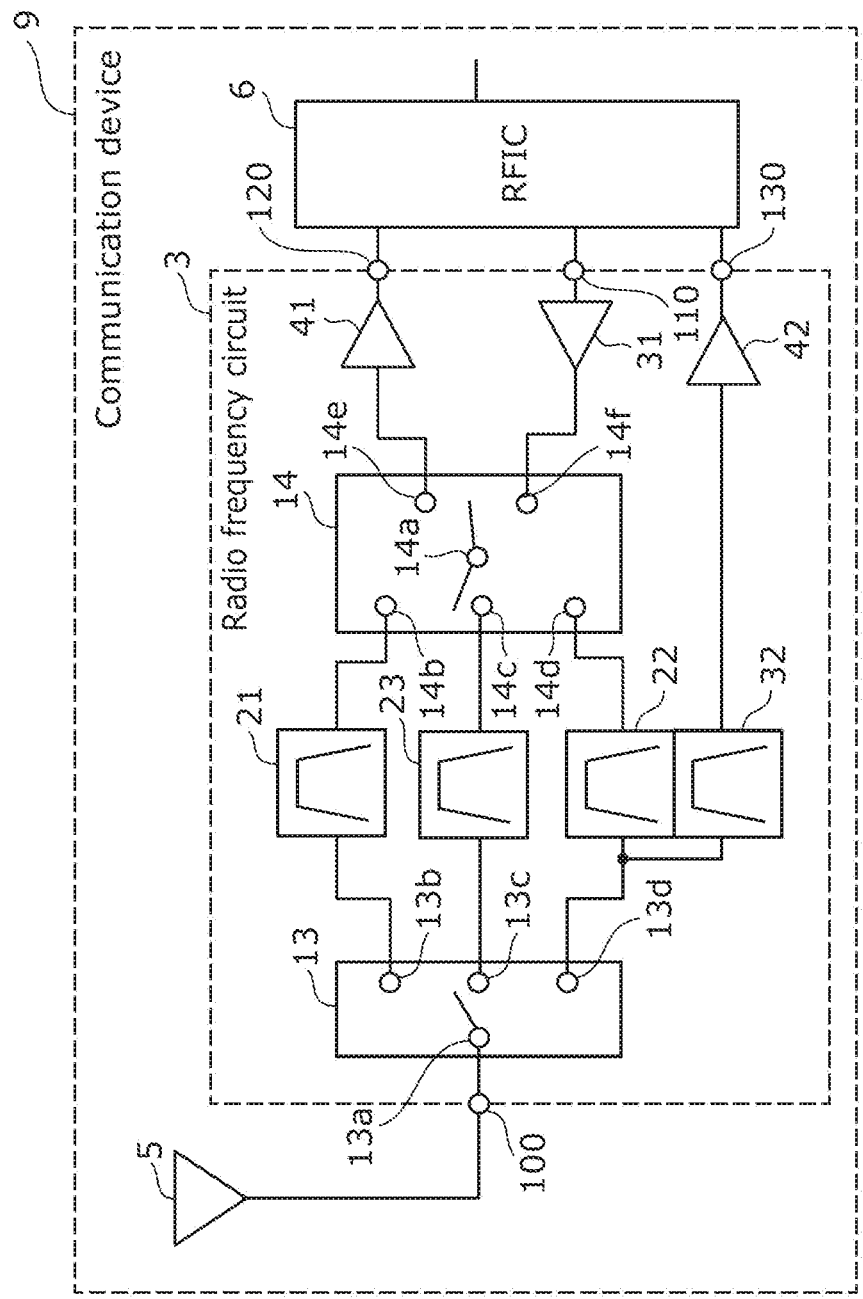
FIG. 8 is a diagram showing the circuit configurations of a radio frequency circuit and a communication device according to Embodiment 3.

FIG. 8 is a diagram showing the circuit configurations of radio frequency circuit 3 and communication device 9 according to Embodiment 3. As shown in the drawing, communication device 9 includes radio frequency circuit 3, antenna 5, and RFIC 6. Communication device 9 according to the present embodiment is different from communication device 8 according to Embodiment 2 only in the configuration of radio frequency circuit 3. As such, the following description focuses on radio frequency circuit 3 to describe communication device 9 according to the present embodiment.

Radio frequency circuit 3 includes antenna connection terminal 100, transmission input terminal 110, reception output terminals 120 and 130, filters 21, 22, 23, and 32, switches 13 and 14, power amplifier 31, and low-noise amplifiers 41 and 42. Radio frequency circuit 3 transfers radio frequency signals in communication band A (first communication band) and radio frequency signals in communication band B (second communication band).

Communication band A in the present embodiment is, for example, n44 (703-803 MHz) of 5G-NR. n44 of 5G-NR is allocated as a 5G communication band for TDD. Other examples of communication band A include B44 (703-803 MHz) of 4G-LTE. B44 of 4G-LTE is allocated as a 4G communication band for TDD.

Communication band B in the present embodiment is, for example, B28 (703-748 MHz as the transmission band and 758-803 MHz as the reception band) of 4G-LTE.

Filter 22, which is an example of the first filter, has the first passband (A2 band). Filter 22 is connected to switches 13 and 14. Filter 21, which is an example of the second filter, has the second passband (A1 band) that is different from the first passband (A2 band). Filter 21 is connected to switches 13 and 14. Filter 23, which is an exemplary fourth filter, has a fourth passband (A3 band) that is different from the first passband (A2 band) and the second passband (A1 band). Filter 23 is connected to switches 13 and 14.

The passband of filter 22 (A2 band) includes the transmission band of communication band B that uses FDD. Filter 32, which is an exemplary third filter, has the third passband (B2 band) that includes the reception band of communication band B. Filter 32 is connected to switch 13 and low-noise amplifier 42. Stated differently, filter 22 and filter 32 are included in the duplexer that transfers a transmission signal and a reception signal in communication band B using FDD.

Note that the passband of filter 22 (A2 band) may include the reception band of communication band B, and the passband of filter 32 (B2 band) may include the transmission band of communication band B.

Power amplifier 31, which is connected to transmission input terminal 110 and switch 14, amplifies a transmission signal in communication band A and a transmission signal in communication band B. Low-noise amplifier 41, which is connected to reception output terminal 120 and switch 14, amplifies a reception signal in communication band A. Low-noise amplifier 42, which is connected to reception output terminal 130 and filter 32, amplifies a reception signal in communication band B.

Switch 13, which is an example of the second switch, includes common terminal 13a, and selection terminals 13b, 13c and 13d. Common terminal 13a is connected to antenna connection terminal 100, selection terminal 13b to filter 21, selection terminal 13c to filter 23, and selection terminal 13d to filters 22 and 32. Having such connection structure, switch 13 switches between connecting antenna connection terminal 100 and filter 21, connecting antenna connection terminal 100 and filters 23, and connecting antenna connection terminal 100 and filters 22 and 32.

Switch 14, which is an example of the first switch, includes common terminal 14a, and selection terminals 14b, 14c, 14d, 14e, and 14f. Selection terminal 14b is connected to filter 21, selection terminal 14c to filter 23, selection terminal 14d to filter 22, selection terminal 14e to the input terminal of low-noise amplifier 41, and selection terminal 14f to the output terminal of power amplifier 31. Switch 14 switches between connecting common terminal 14a to selection terminal 14b, connecting common terminal 14a to selection terminal 14c, and connecting common terminal 14a to selection terminal 14d. Switch 14 also switches between connecting common terminal 14a to selection terminal 14e, and connecting common terminal 14a to selection terminal 14f. Having such connection structure, switch 14 switches between connecting filter 22 to power amplifier 31 and connecting filter 22 to low-noise amplifier 41, switches between connecting filter 21 to power amplifier 31 and connecting filter 21 to low-noise amplifier 41, and switches between connecting filter 23 to power amplifier 31 and connecting filter 23 to low-noise amplifier 41. Switch 14 is, for example, a switch circuit that includes a single pole tripe throw (SP3T) sub-switch having common terminal 14a, and selection terminals 14b, 14c, and 14d, and an SPDT sub-switch having common terminal 14a, and selection terminals 14e and 14f, where common terminals 14a of these two sub-switches are connected.

3.2 Frequency Relationships Between Communication Bands and Filter Passbands

The following describes relationships between the frequency ranges of radio frequency signals transferred by radio frequency circuit 3 according to the present embodiment and the passbands of filters 21, 22, 23 and 32.

Figure 9:
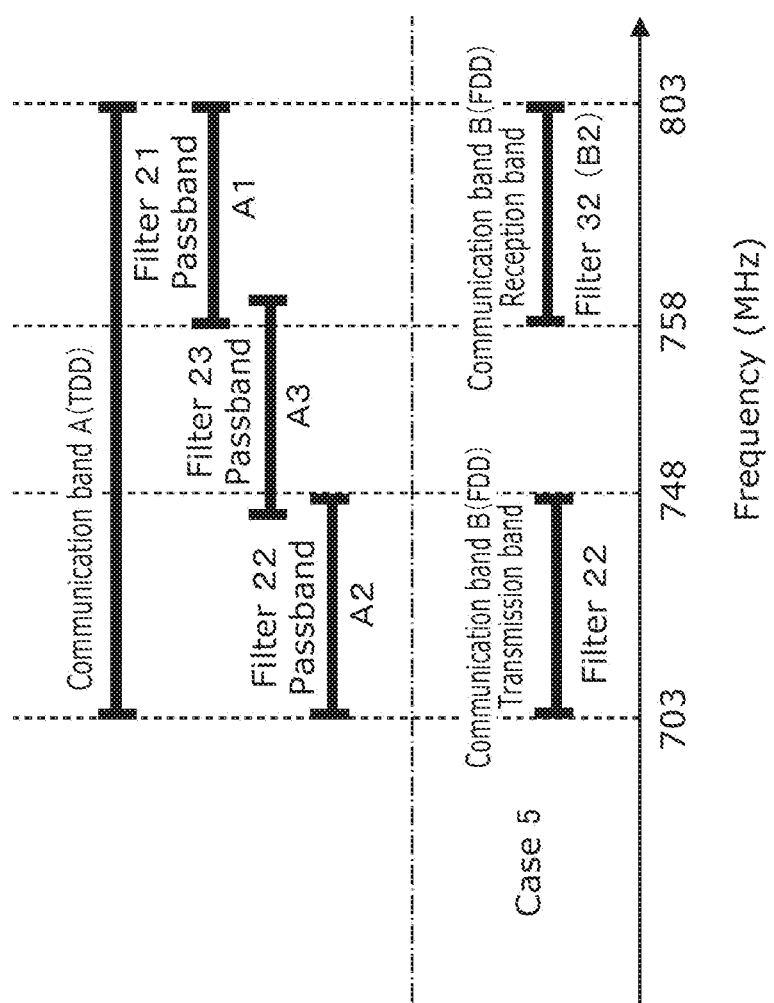
FIG. 9 is a diagram showing a frequency relationship between the TDD/FDD communication bands used by the radio frequency circuit according to Embodiment 3 and filter passbands.

FIG. 9 is a diagram showing a frequency relationship between communication band A (TDD) and communication band B (FDD) used by radio frequency circuit 3 according to Embodiment 3 and the passbands of filters 21, 22, 23 and 32.

As shown in the drawing, the passband of filter 22 (A2 band) corresponds to a portion of the frequency range of communication band A, and corresponds to the transmission band of communication band B. Also, the passband of filter 21 (A1 band) corresponds to a portion of the frequency range of communication band A. Also, the passband of filter 23 (A3 band) corresponds to a portion of the frequency range of communication band A. The frequency ranges of the A1 band, the A2 band, and the A3 band are different. Also, the passband of filter 32 (B2 band) corresponds to the reception band of communication band B. Note that the A1 band, the A2 band, and the A3 band may not overlap or may partially overlap.

Note that the passband of filter 22 (A2 band) included in communication band A may include the transmission band of communication band B as shown as "Case 5" in FIG. 9, or the passband of filter 22 (A2 band) included in communication band A may include the reception band of communication band B.

In radio frequency circuit 3 according to the present embodiment, three filters 21, 22, and 23 having different passbands enable the signal transfer in communication band A allocated for TDD (e.g., n44) in which a transmission signal and a reception signal are transferred in different time slots. Radio frequency circuit 3 according to the present embodiment is thus capable of transferring radio frequency signals in a broad communication band A allocated for TDD without signal degradation. Furthermore, this configuration uses filter 22 to transfer signals in communication band B allocated for FDD (e.g., B28) in which a transmission signal and a reception signal are transferred in different frequency bands. Stated differently, filter 22 is shared for the signal transfer in communication band A and the signal transfer in communication band B, thereby enabling the downsizing of radio frequency circuit 3 that uses both TDD and FDD.

Further, radio frequency circuit 3 according to the present embodiment covers the frequency range of communication band A for TDD by combining the passbands of three filters 21 through 23. This enables radio frequency circuit 3 to be more capable of reducing the insertion loss in the passband of communication band A and attenuating unwanted radiation in the vicinity of the passband than radio frequency circuit 2 according to Embodiment 2.

Embodiment 4

The radio frequency circuits according to Embodiment 1 through 3 use communication band A for TDD having a microwave frequency range or a greater frequency range. Radio frequency circuit 4 according to the present embodiment uses communication band A for TDD having a millimeter-wave frequency range.

4.1 Circuit Configurations of Radio Frequency Circuit 4 and Communication Device 10

Figure 10:
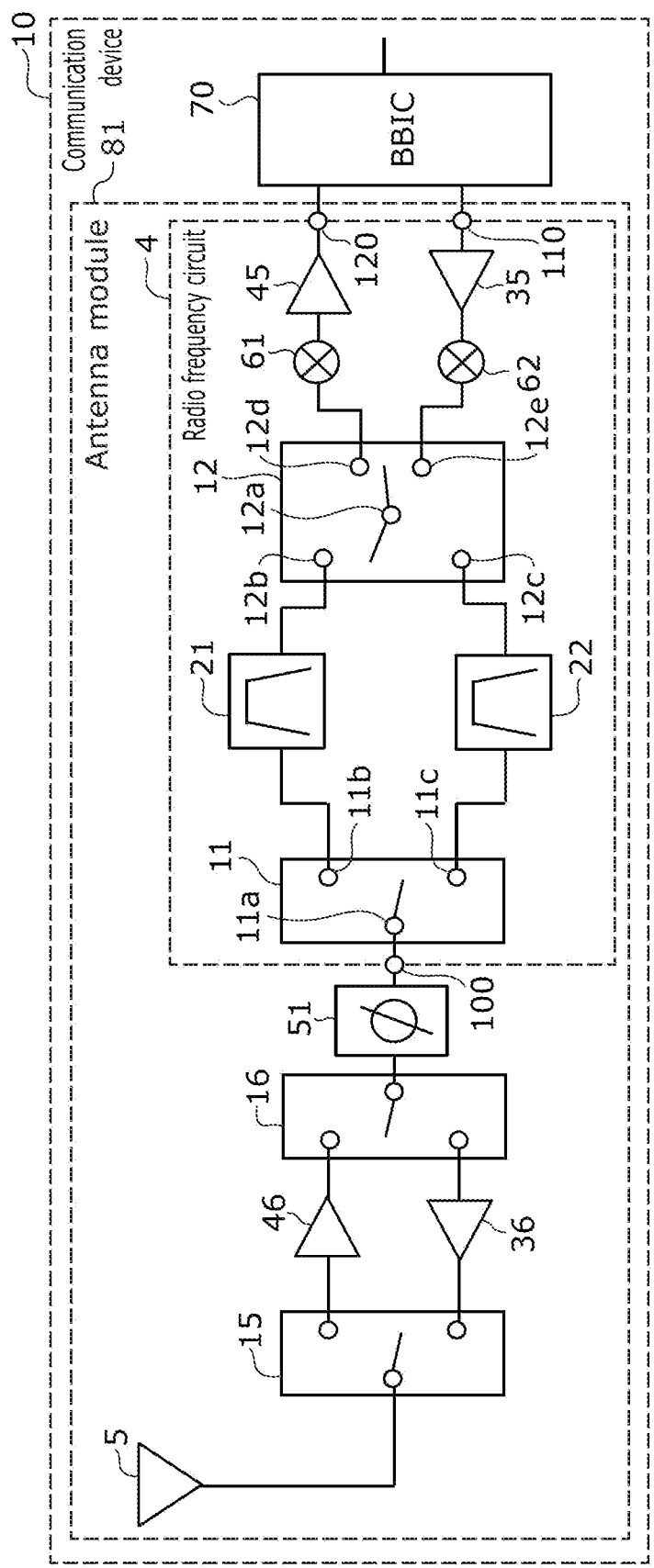
FIG. 10 is a diagram showing the circuit configurations of a radio frequency circuit, an antenna module, and a communication device according to Embodiment 4.

FIG. 10 is a diagram showing the circuit configurations of radio frequency circuit 4, antenna module 81, and communication device 10 according to Embodiment 4. As shown in the drawing, communication device 10 includes radio frequency circuit 4, antenna 5, switches 15 and 16, power amplifier 36, low-noise amplifier 46, phase shifter 51, and base band signal processing circuit (BBIC) 70. Antenna module 81 includes radio frequency circuit 4, antenna 5, switches 15 and 16, power amplifier 36, low-noise amplifier 46, and phase shifter 51. Communication device 10 according to the present embodiment is different from communication device 7 according to Embodiment 1 in the configuration of radio frequency circuit 4 and in that switches 15 and 16, power amplifier 36, low-noise amplifier 46, phase shifter 51, and BBIC 70 are added. As such, the following description focuses on the differences from communication device 7 according to Embodiment 1 to describe communication device 10 according to the present embodiment.

Switches 15 and 16 are included in a switch circuit that switches a connection of power amplifier 36 between switches 15 and 16 and a connection of low-noise amplifier 46 between switches 15 and 16. Stated differently, the switch circuit that includes switches 15 and 16 is a switch circuit for flowing, to communication device 10, one of a transmission signal transmitted from antenna 5 and a reception signal received by antenna 5.

Power amplifier 36, which is connected between switches 15 and 16, amplifies a transmission signal in communication band A (first communication band). Low-noise amplifier 46, which is connected between switches 15 and 16, amplifies a reception signal in communication band A (first communication band).

Phase shifter 51, which is connected between switch 16 and antenna connection terminal 100 of radio frequency circuit 4, shifts the phases of a transmission signal and a reception signal in communication band A.

BBIC 70 is a circuit that performs signal processing by use of a signal in an intermediate frequency range, the frequency of which is lower than that of a radio frequency signal transmitted/received by antenna 5. An intermediate frequency transmission signal processed by BBIC 70 is outputted to transmission input terminal 110 of radio frequency circuit 4. An intermediate frequency reception signal processed by BBIC 70 is used, for example, as an image signal for image display, or as a sound signal for telephone conversation through a speaker.

Radio frequency circuit 4 includes antenna connection terminal 100, transmission input terminal 110, reception output terminal 120, filters 21 and 22, switches 11 and 12, mixers 61 and 62, power amplifier 35, and low-noise amplifier 45.

Communication band A in the present embodiment is, for example, n257 (26.5-29.5 MHz) of 5G-NR. n257 of 5G-NR is allocated as a 5G communication band for TDD. Note that communication band A according to the present embodiment is not limited to a communication band allocated for TDD.

Filter 22, which is an example of the first filter, has the first passband (A2 band). Filter 22 is connected to switches 11 and 12. Filter 21, which is an example of the second filter, has the second passband (A1 band) that is different from the first passband (A2 band). Filter 21 is connected to switches 11 and 12.

Power amplifier 35, which is connected to transmission input terminal 110 and mixer 62, amplifies an intermediate frequency transmission signal, which corresponds to a transmission signal in communication band A. Low-noise amplifier 45, which is connected to reception output terminal 120 and mixer 61, amplifies an intermediate frequency reception signal, which corresponds to a reception signal in communication band A.

Mixer 62, which is an exemplary first mixer, is connected to selection terminal 12e of switch 12 and the output terminal of power amplifier 35. Mixer performs a frequency conversion on the intermediate frequency transmission signal to obtain a millimeter-wave transmission signal that is a signal in a millimeter-wave frequency range included in communication band A.

Mixer 61, which is an exemplary second mixer, is connected to selection terminal 12d of switch 12 and the input terminal of low-noise amplifier 45. Mixer 61 performs a frequency conversion on a millimeter-wave reception signal that is a signal in the millimeter-wave frequency range included in communication band A to obtain an intermediate frequency reception signal.

Switch 12, which is an example of the first switch, includes common terminal 12a, and selection terminals 12b, 12c, 12d, and 12e. Selection terminal 12b is connected to filter 21, selection terminal 12c to filter 22, selection terminal 12d to mixer 61, and selection terminal 12e to mixer 62. Switch 12 switches between connecting common terminal 12a to selection terminal 12b and connecting common terminal 12a to selection terminal 12c, and switches between connecting common terminal 12a to selection terminal 12d and connecting common terminal 12a to selection terminal 12e. Having such connection structure, switch 12 switches between connecting filter 22 to power amplifier 35 and connecting filter 22 to low-noise amplifier 45, and switches between connecting filter 21 to power amplifier 35 and connecting filter 21 to low-noise amplifier 45.

In radio frequency circuit 4 according to the present embodiment, two filters 21 and 22 having different passbands enable the signal transfer in communication band A having a millimeter-wave frequency range (e.g., n257). Stated differently, radio frequency circuit 4 according to the present embodiment covers a broad communication band A by combining the passbands of two filters 21 and 22, thus achieving a signal transfer with a low loss. Also, two filters 21 and 22 having relatively narrow passbands cover communication band A, thereby ensuring a sufficient attenuation in the vicinity of the passband and satisfying specifications for unwanted radiation in the vicinity of the passband. Radio frequency circuit 4 according to the present embodiment is thus capable of transferring radio frequency signals in a broad communication band A without a signal degradation.

Note that in radio frequency circuit 4, the first passband may be included in the frequency range of communication band B (second communication band) allocated as a communication band for TDD.

This configuration uses filter 22 to transfer signals in communication band B allocated for TDD (e.g., B258 (24.25-27.5 GHz) of 5G-NR). Stated differently, filter 22 is shared for the signal transfer in communication band A and the signal transfer in communication band B, thereby enabling the downsizing of radio frequency circuit 4 that uses TDD.

As described above, each of radio frequency circuits 1 through 4 includes: filter 22 having a first passband that corresponds to a portion of the frequency range of communication band A allocated as a communication band for TDD; filter 21 having a second passband that corresponds to a portion of the frequency range of communication band A, the second passband being different from the first passband; power amplifier 31 that amplifies a transmission signal in communication band A; low-noise amplifier 41 that amplifies a reception signal in communication band A; and switch 12 that switches between connecting filter 22 and power amplifier 31 and connecting filter 22 and low-noise amplifier 41, and switches between connecting filter 21 and power amplifier 31 and connecting filter 21 and low-noise amplifier 41.

In this configuration, two filters 21 and 22 having different passbands enable the signal transfer in communication band A allocated for TDD in which a transmission signal and a reception signal are transferred in different time slots. Stated differently, the radio frequency circuit with this configuration covers a broad communication band A by combining the passbands of two filters 21 and 22, thus achieving a signal transfer with low loss. Also, two filters 21 and 22 having relatively narrow passbands cover communication band A, thereby ensuring a sufficient attenuation in the vicinity of the passband and satisfying specifications for unwanted radiation in the vicinity of the passband. The radio frequency circuit is thus capable of transferring radio frequency signals in a broad communication band A allocated for TDD without signal degradation.

Also, each of radio frequency circuits 1 through 4 may further include: antenna connection terminal 100; and switch 11 that switches between connecting antenna connection terminal 100 and filter 22 and connecting antenna connection terminal 100 and filter 21.

This configuration improves the isolation between a radio frequency signal that passes through filter 21 and a radio frequency signal that passes through filter 22. This configuration is effective particularly for the case where the passband of filter 21 and the passband of filter 22 partially overlap.

In each of radio frequency circuits 1 through 3, the first passband of filter 22 may include one of the transmission band and the reception band of communication band B allocated as a communication band for FDD.

This configuration enables filter 22 to be shared for the signal transfer in communication band A and the signal transfer in communication band B, thus achieving the downsizing of the radio frequency circuit applicable to both TDD and FDD.

Each of radio frequency circuits 2 and 3 may further include: filter 32 having a third passband that includes a remaining one of the transmission band and the reception band of communication band B. In each of radio frequency circuits 2 and 3, filter 22 and filter 32 may be included in a duplexer that transfers a transmission signal and a reception signal in communication band B, using FDD.

This configuration enables filter 22 to be shared for the signal transfer in communication band A and the signal transfer in communication band B, thus achieving the downsizing of the radio frequency circuit that uses both TDD and FDD.

In each of radio frequency circuits 2 and 3, a transmission signal and a reception signal of TDD and one of a transmission signal and a reception signal of FDD may pass through filter 22, the transmission signal and the reception signal of TDD may pass through filter 21, and the transmission signal and the reception signal of FDD may not pass through filter 21, and the transmission signal and the reception signal of TDD may not pass through filter 32, and a remaining one of the transmission signal and the reception signal of FDD may pass through filter 32.

In radio frequency circuit 2, the first passband may be included in the frequency range of communication band B that is allocated as a communication band for TDD.

This configuration uses filter 22 to transfer signals in communication band B allocated for TDD. Stated differently, filter 22 is shared for the signal transfer in communication band A and the signal transfer in communication band B, thereby achieving the downsizing of radio frequency circuit 2 that uses TDD.

In each of radio frequency circuits 1 through 4, switch 12 may include selection terminals 12b, 12c, 12d and 12e. Selection terminal 12c is connected to filter 22, selection terminal 12b is connected to filter 21, selection terminal 12e is connected to power amplifier 31, and selection terminal 12d is connected to low-noise amplifier 41. Switch 12 may: connect selection terminal 12c to the selection terminal 12e and disconnect selection terminal 12c from selection terminal 12d to cause a transmission signal in the first passband of communication band A to pass through filter 22; connect selection terminal 12b to selection terminal 12e and disconnect selection terminal 12b from selection terminal 12d to cause a transmission signal in the second passband of communication band A to pass through filter 21; connect selection terminal 12c to selection terminal 12d and disconnect selection terminal 12c from selection terminal 12e to cause a reception signal in the first passband of communication band A to pass through filter 22; and connect selection terminal 12b and selection terminal 12d and disconnect selection terminal 12b from selection terminal 12e to cause a reception signal in the second passband of communication band A to pass through filter 21.

In each of radio frequency circuits 2 and 3, switch 12 may include selection terminals 12b, 12c, 12d, and 12e. Selection terminal 12c is connected to filter 22, selection terminal 12b is connected to filter 21, selection terminal 12e is connected to power amplifier 31, selection terminal 12d is connected to low-noise amplifier 41. Switch 12 may: connect selection terminal 12c to selection terminal 12e and disconnect selection terminal 12c from selection terminal 12d to cause (i) a transmission signal in the first passband of communication band A to pass through filter 22, or (ii) a signal in one of the transmission band and the reception band of communication band B to pass through filter 22, and cause a signal in a remaining one of the transmission band and the reception band of communication band B to pass through filter 32; connect selection terminal 12b to selection terminal 12e and disconnect selection terminal 12b to selection terminal 12d to cause the transmission signal in the second passband of communication band A to pass through filter 21; connect selection terminal 12c to selection terminal 12d and disconnect selection terminal 12c to selection terminal 12e to cause a reception signal in the first passband of communication band A to pass through filter 22; and connect selection terminal 12b to selection terminal 12d and disconnect selection terminal 12b from selection terminal 12e to cause the reception signal in the second passband of communication band A to pass through filter 21.

Radio frequency circuit 3 may further include: filter 23 having a fourth passband that corresponds to a portion of the frequency range of communication band A, the fourth passband being different from the first passband and the second passband.

This configuration enables radio frequency circuit 3 to be more capable of reducing the insertion loss in the passband of communication band A and attenuating unwanted radiation in the vicinity of the passband than radio frequency circuit 2.

In each of radio frequency circuits 1 through 3, filter 22 and filter 21 may be acoustic wave filters.

In this configuration, a plurality of narrow-band acoustic wave filters having steep attenuation characteristics and capable of a low-loss signal transfer are disposed in parallel. This configuration thus achieves the bandpass characteristics of a broad communication band A having steep attenuation characteristics and capable of a low-loss signal transfer.

In each of radio frequency circuits 1 through 4, communication band A may be a 5G-NR communication band.

Also, radio frequency circuit 4 includes: filter 22 having a first passband that corresponds to a portion of the frequency range of communication band A; filter 21 having a second passband that corresponds to a portion of the frequency range of communication band A, the second passband being different from the first passband; power amplifier 35 that amplifies an intermediate frequency transmission signal; low-noise amplifier 45 that amplifies an intermediate frequency reception signal; mixer 62 that performs the frequency conversion on the intermediate frequency transmission signal to obtain a millimeter-wave transmission signal that is a signal in a millimeter-wave frequency range included in communication band A; mixer 61 that performs the frequency conversion on a millimeter-wave reception signal to obtain the intermediate frequency reception signal, the millimeter-wave reception signal being a signal in the millimeter-wave frequency range included in communication band A; and switch 12 that switches between connecting filter 22 and mixer 62 and connecting filter 22 and mixer 61, and switches between connecting filter 21 and mixer 62 and connecting filter 21 and mixer 61.

In this configuration, two filters 21 and 22 having different passbands enable the signal transfer in communication band A having a millimeter-wave frequency range in which a transmission signal and a reception signal are transferred in different time slots. Stated differently, the radio frequency circuit with this configuration covers a broad communication band A by combining the passbands of two filters 21 and 22, thus achieving signal transfer with a low loss. Also, two filters 21 and 22 having relatively narrow passbands cover communication band A, thereby ensuring a sufficient attenuation in the vicinity of the passband and satisfying specifications for unwanted radiation in the vicinity of the passband. The radio frequency circuit with this configuration is thus capable of transferring radio frequency signals in a broad communication band A allocated for TDD without signal degradation.

In radio frequency circuit 4, the first passband may be included in the frequency range of communication band B allocated as a communication band for TDD.

This configuration uses filter 22 to transfer signals in communication band B allocated for TDD. Stated differently, filter 22 is shared for the signal transfer in communication band A and the signal transfer in communication band B, thereby achieving the downsizing of radio frequency circuit 4 that uses TDD.

Antenna module 80 includes: antenna 5; and radio frequency circuit 1 that transfers a radio frequency signal that is to be transmitted or has been received by antenna 5.

This configuration provides antenna module 80 capable of transferring a radio frequency signal in a broad communication band A allocated for TDD without signal degradation.

Antenna module 81 includes: antenna 5; and radio frequency circuit 4 that transfers a radio frequency signal that is to be transmitted or has been received by antenna 5.

This configuration provides antenna module 81 capable of transferring a radio frequency signal in communication band A having a millimeter-wave frequency range without signal degradation.

Also, each of communication devices 7 through 9 includes: antenna 5; RFIC 6 that processes a radio frequency signal that is to be transmitted or has been received by antenna 5; and any one of radio frequency circuits 1 through 3 that transfers the radio frequency signal between antenna 5 and RFIC 6.

This configuration provides communication devices 7 through 9 capable of transferring a radio frequency signal in a broad communication band A allocated for TDD without signal degradation.

Also, communication device 10 includes: antenna 5; BBIC 6 that processes an intermediate frequency transmission signal that corresponds to a transmission signal transmitted from antenna 5, and an intermediate frequency reception signal that corresponds to a reception signal received by antenna 5; and radio frequency circuit 4 that performs frequency a conversion on the intermediate frequency transmission signal to obtain the transmission signal and on the reception signal to obtain the intermediate frequency reception signal, the frequency conversion being performed on the intermediate frequency transmission signal and the intermediate frequency reception signal transferred between antenna 5 and BBIC 6.

This configuration provides communication device 10 capable of transferring a radio frequency signal in communication band A having a millimeter-wave frequency range without signal degradation.

Another Embodiment

The radio frequency circuit, the antenna module, and the communication device according to the present disclosure have been described above using Embodiments 1 through 3, but the present disclosure is not limited to the foregoing embodiments. The present disclosure also includes: another embodiment achieved by freely combining structural elements in the foregoing embodiments; variations achieved by making various modifications to the foregoing embodiments that can be conceived by those skilled in the art without departing from the essence of the present disclosure; and various devices that include the radio frequency circuit, the antenna module, and the communication device according to the present disclosure.

In the radio frequency circuit, the antenna module, and the communication device according to each of the foregoing embodiments, for example, a matching element such as an inductor and a capacitor, and a switch circuit may be connected between structural elements. Note that the inductor may include a wiring inductor implemented as wiring that connects structural elements.

Note that in the foregoing Embodiments 1 through 3, a communication system means a communication system that is configured using radio access technology (RAT) defined by a standard body, etc. such as 3GPP and Institute of Electrical and Electronics Engineers (IEEE). Non-limiting examples of a communication system include a 5G-NR system, a 4G-LTE system, and a Wireless Local Area Network (WLAN) system.

Also, a communication band means a frequency band that is predefined by a standard body, etc. for a communication system. Non-limiting examples of a communication band include a 5G-NR frequency band and a 4G-LTE frequency band.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The present disclosure is widely applicable for use in communication devices (e.g., a mobile phone) as a radio frequency circuit, an antenna module, and a communication device used for a signal transfer in a broad TDD communication band.

The invention claimed is:

1. A radio frequency circuit, comprising:
   a first filter having a first passband that corresponds to a portion of a frequency range of a first communication band allocated as a communication band for time division duplex, the first communication band being a single continuous band;
   a second filter having a second passband that corresponds to a portion of the frequency range of the first communication band, the second passband being different from the first passband;
   a power amplifier configured to amplify a transmission signal in the first communication band;
   a low-noise amplifier configured to amplify a reception signal in the first communication band; and
   a first switch configured to switch between connecting the first filter and the power amplifier and connecting the first filter and the low-noise amplifier, and to switch between connecting the second filter and the power amplifier and connecting the second filter and the low-noise amplifier,
   wherein the first passband includes a portion of a frequency range of a second communication band that is allocated as a communication band for time division duplex.

2. The radio frequency circuit according to claim 1, further comprising:
   an antenna connection terminal; and
   a second switch configured to switch between connecting the antenna connection terminal and the first filter and connecting the antenna connection terminal and the second filter.

3. The radio frequency circuit according to claim 1,
   wherein the first passband includes one of a transmission band or a reception band of the second communication band allocated as a communication band for frequency division duplex.

4. The radio frequency circuit according to claim 1, further comprising:
   a third filter having a third passband that includes a remaining one of the transmission band and the reception band of the second communication band,
   wherein the first filter and the third filter are included in a duplexer configured to transfer a transmission signal and a reception signal in the second communication band, using frequency division duplex.

5. The radio frequency circuit according to claim 4,
   wherein a transmission signal and a reception signal of time division duplex and one of a transmission signal and a reception signal of frequency division duplex pass through the first filter,
   the transmission signal and the reception signal of time division duplex pass through the second filter, and the transmission signal and the reception signal of frequency division duplex do not pass through the second filter, and
   the transmission signal and the reception signal of time division duplex do not pass through the third filter, and a remaining one of the transmission signal and the reception signal of frequency division duplex passes through the third filter.

6. The radio frequency circuit according to claim 1,
   wherein the first switch includes a first selection terminal, a second selection terminal, a third selection terminal, and a fourth selection terminal,
   the first selection terminal is connected to the first filter,
   the second selection terminal is connected to the second filter,
   the third selection terminal is connected to the power amplifier,
   the fourth selection terminal is connected to the low-noise amplifier, and
   the first switch is configured to:
      connect the first selection terminal and the third selection terminal and not connect the first selection terminal and the fourth selection terminal to cause a transmission signal in the first passband of the first communication band to pass through the first filter;
      connect the second selection terminal and the fourth selection terminal and not connect the second selection terminal and the third selection terminal to cause a transmission signal in the second passband of the first communication band to pass through the second filter;
      connect the first selection terminal and the fourth selection terminal and not connect the first selection terminal and the third selection terminal to cause a reception signal in the first passband of the first communication band to pass through the first filter; and
      connect the second selection terminal and the fourth selection terminal and not connect the second selection terminal and the third selection terminal to cause a reception signal in the second passband of the first communication band to pass through the second filter.

7. The radio frequency circuit according to claim 5, wherein the first switch includes a first selection terminal, a second selection terminal, a third selection terminal, and a fourth selection terminal, the first selection terminal is connected to the first filter,
the second selection terminal is connected to the second filter,
the third selection terminal is connected to the power amplifier,
the fourth selection terminal is connected to the low-noise amplifier, and
the first switch is configured to:
connect the first selection terminal and the third selection terminal and not connect the first selection terminal and the fourth selection terminal to cause (i) a transmission signal in the first passband of the first communication band to pass through the first filter, or (ii) a signal in one of the transmission band and the reception band of the second communication band to pass through the first filter, and to cause a signal in a remaining one of the transmission band and the reception band of the second communication band to pass through the third filter;
connect the second selection terminal and the third selection terminal and not connect the second selection terminal and the fourth selection terminal to cause the transmission signal in the second passband of the first communication band to pass through the second filter;
connect the first selection terminal and the fourth selection terminal and not connect the first selection terminal and the third selection terminal to cause a reception signal in the first passband of the first communication band to pass through the first filter; and
connect the second selection terminal and the fourth selection terminal and not connect the second selection terminal and the third selection terminal to cause the reception signal in the second passband of the first communication band to pass through the second filter.

8. The radio frequency circuit according to claim 1, further comprising:
a fourth filter having a fourth passband that corresponds to a portion of the frequency range of the first communication band, the fourth passband being different from the first passband and the second passband.

9. The radio frequency circuit according to claim 1, wherein the first filter and the second filter are acoustic wave filters.

10. The radio frequency circuit according to claim 1, wherein the first communication band is a Fifth Generation-New Radio (5G-NR) communication band.

11. The radio frequency circuit according to claim 10, wherein the first communication band is one of n77, n78, n79, n46, n96, n97, or n50 of 5G-NR.

12. A radio frequency circuit, comprising:
a first filter having a first passband that corresponds to a portion of a frequency range of a first communication band that is a single continuous band;
a second filter having a second passband that corresponds to a portion of the frequency range of the first communication band, the second passband being different from the first passband;
a power amplifier configured to amplify an intermediate frequency transmission signal;
a low-noise amplifier configured to amplify an intermediate frequency reception signal;
a first mixer configured to perform a frequency conversion on the intermediate frequency transmission signal to obtain a millimeter-wave transmission signal that is a signal in a millimeter-wave frequency range included in the first communication band;
a second mixer configured to perform a frequency conversion on a millimeter-wave reception signal to obtain the intermediate frequency reception signal, the millimeter-wave reception signal being a signal in the millimeter-wave frequency range included in the first communication band; and
a first switch configured to switch between connecting the first filter and the first mixer and connecting the first filter and the second mixer, and to switch between connecting the second filter and the first mixer and connecting the second filter and the second mixer,
wherein the first passband includes a portion of a frequency range of a second communication band allocated as a communication band for time division duplex.

13. The radio frequency circuit according to claim 12, wherein the first communication band is n257 of 5G-NR.

14. An antenna module, comprising:
an antenna; and
the radio frequency circuit according to claim 1 configured to transfer a radio frequency signal that is to be transmitted or has been received by the antenna.

15. An antenna module, comprising:
an antenna; and
the radio frequency circuit according to claim 12 configured to transfer a radio frequency signal that is to be transmitted or has been received by the antenna.

16. A communication device, comprising:
an antenna;
a radio frequency (RF) signal processing circuit configured to process a radio frequency signal that is to be transmitted or has been received by the antenna; and
the radio frequency circuit according to claim 1 configured to transfer the radio frequency signal between the antenna and the RF signal processing circuit.

17. A communication device, comprising:
an antenna;
a base band signal processing circuit configured to process an intermediate frequency transmission signal that corresponds to a transmission signal transmitted from the antenna, and an intermediate frequency reception signal that corresponds to a reception signal received by the antenna; and
the radio frequency circuit according to claim 12 configured to perform a frequency conversion on the intermediate frequency transmission signal to obtain the transmission signal and on the reception signal to obtain the intermediate frequency reception signal, the intermediate frequency transmission signal and the intermediate frequency reception signal being transferred between the antenna and the base band signal processing circuit.

18. The radio frequency circuit according to claim 1, wherein the frequency range of the first communication band is 5.925 GHz to 7.125 GHz or 3.3 GHz to 3.8 GHz.

\* \* \* \* \*